United States Patent
Huggett et al.

[11] Patent Number: 5,949,204
[45] Date of Patent: Sep. 7, 1999

[54] METHOD AND APPARATUS FOR DRIVING A BRUSHLESS DC MOTOR WITHOUT ROTOR POSITION SENSORS

[75] Inventors: Colin Huggett, Torrance; Gabor P. Kalman, Palos Verdes, both of Calif.

[73] Assignee: AlliedSignal Inc., Morristown, N.J.

[21] Appl. No.: 09/075,425

[22] Filed: May 8, 1998

Related U.S. Application Data

[60] Provisional application No. 60/058,914, Aug. 18, 1997.

[51] Int. Cl.$^6$ .................................................. H02P 7/00
[52] U.S. Cl. .......................... 318/254; 318/439; 318/138
[58] Field of Search .................................. 318/138, 245, 318/254, 439, 799–812

[56] References Cited

U.S. PATENT DOCUMENTS

| | | |
|---|---|---|
| 4,743,815 | 5/1988 | Gee et al. . |
| 5,028,852 | 7/1991 | Dunfield ................................ 318/254 |
| 5,034,668 | 7/1991 | Bausch ................................ 318/254 |
| 5,223,771 | 6/1993 | Chari ................................ 318/254 |
| 5,334,917 | 8/1994 | Lind ................................ 318/254 |
| 5,451,832 | 9/1995 | Cameron et al. ................................ 318/375 |
| 5,455,885 | 10/1995 | Cameron ................................ 388/834 |
| 5,457,374 | 10/1995 | Branecky et al. ................................ 318/801 |
| 5,466,997 | 11/1995 | Utenick et al. . |
| 5,534,763 | 7/1996 | Williams et al. ................................ 318/799 |
| 5,572,097 | 11/1996 | Cameron ................................ 318/254 |
| 5,619,109 | 4/1997 | Cameron et al. ................................ 318/375 |
| 5,694,010 | 12/1997 | Oomura et al. ................................ 318/254 |
| 5,821,708 | 10/1998 | Williams et al. ................................ 318/254 |
| 5,869,946 | 2/1999 | Carobolante ................................ 318/811 |

FOREIGN PATENT DOCUMENTS 0 735 662 10/1996 European Pat. Off. .

OTHER PUBLICATIONS

Joohn–Sheok Kim, et al., "New Approach for the Low Speed Operation of the PMSM Drives Without Rotational Position Sensors", Records of the Annual Power Electronics Specialists Conference (PESC., Atlanta), vol. 2, Nr. Con. 26, Jun. 12, 1996, pp. 766–771.

D. Gerenier, et al., "A Park–like Transformation for the Study and the Control of a Non–Sinusoidal Brushless DC Motor", Proceedings of the 1995 IEEE EICON International Conference on Industrial Electronics . . . , 11.6–10, 1995, p. 838, par. B–C.

*Primary Examiner*—Paul Ip
*Attorney, Agent, or Firm*—Robert Desmond, Esq.

[57] ABSTRACT

In a brushless dc motor, commutation is performed without the use of rotor position sensors. A voltage across a non-conducting winding of the motor is measured, a voltage across a conducting winding of the motor is computed, an emf Park vector is computed from the voltages, an imaginary component of a rotated emf Park vector is extracted, and the imaginary component is processed to determine when to perform the commutation from one winding to the next sequential winding.

19 Claims, 3 Drawing Sheets

METHOD AND APPARATUS FOR DRIVING A BRUSHLESS DC MOTOR WITHOUT ROTOR POSITION SENSORS

This application claims the benefit of provisional application Ser. No. 60/058,914 filed on Aug. 18, 1997.

BACKGROUND OF THE INVENTION

The invention relates to electrical machines. More specifically, the invention relates to a drive for a brushless dc motor.

A brushless dc motor typically utilizes rotor position sensors for providing information regarding the position of the motor's rotor with respect to the motor's stator windings. The positional information allows for proper commutation and control of the stator windings. Rotor position sensors such as Hall effect devices are typically mounted in the stator, proximate the motor windings. The rotor position sensors provide intelligence upon rotor position.

Rotor position sensors can be unreliable due to mechanical alignment problems (e.g., problems caused by bearings) and temperature incompatibility problems between the motor windings and electronic components such as the Hall effect devices. Moreover, the rotor position sensors can be difficult to mount to the motor during motor assembly, especially for multi-pole motors. In multi-pole motors, the electrical misalignment angle is equivalent to the angular mechanical misalignment angle multiplied by the number of pairs of poles.

SUMMARY OF THE INVENTION

The invention can be regarded as a method of operating a dc brushless motor without rotor position sensors and thereby avoiding the problems associated with rotor position sensors. A voltage across a non-conducting winding of the motor is determined, a voltage across a conducting winding of the motor is determined, a component from the determined voltages is extracted, and the component is processed to determine when to perform the commutation from one winding to the next sequential winding.

DETAILED DESCRIPTION OF THE INVENTION

Figure 1:
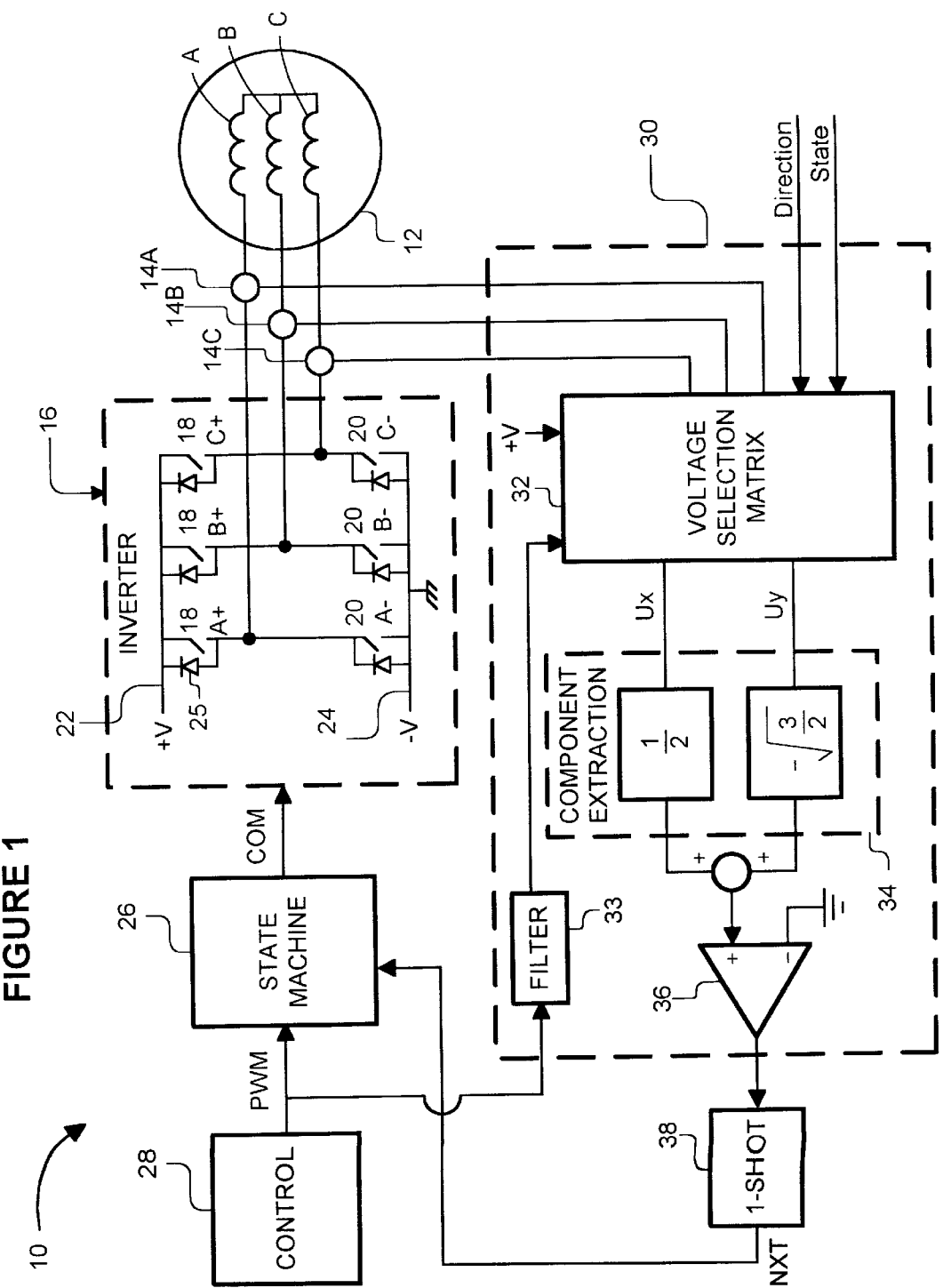
FIG. 1 is a block diagram of a drive system including a brushless dc motor.

FIG. 1 shows a brushless dc motor drive system 10 including the motor portion 12 of a brushless dc motor (BLDCM). The motor portion 12 of the BLDCM includes a multi-pole permanent magnet rotor (not shown) and three stator windings A, B, C. Because of the spatial relationship of the three stator windings (each being displaced by 120 electrical degrees), a "rotating" magnetic field is produced when a current is caused to flow sequentially through any set of two windings AB, BC or CA over a 120 degree time interval (commonly referred to as a 120 degree conduction). The rotating magnetic field is represented by a current "Park vector." A Park vector, in general, is a mathematical representation that describes the locus of an electrical quantity in the complex space domain (where time is a parameter). The current Park vector is defined with the vector's amplitude and the vector's direction in spatial relation to the windings A, B, C. For the drive system 10 the current Park vector has six directional positions IAB, IAC, IBC, IBA, ICA and ICB, corresponding to the three windings A, B, C. A general discussion of Park vectors can be found in P.K. Kovacs, "Transient Phenomena in Electrical Machines," Elsevier Science Publishing Co. (1984).

Rotating the rotor produces a "rotating" magnetic field, which can be described by a rotor flux vector R. The air gap voltage and/or emf can also be represented by their corresponding Park vectors. An emf Park vector Vemf has a real component Ux and an imaginary component Uy. These orthogonal components Ux and Uy are expressed in the Cartesian coordinates of the complex domain in which the emf Park vector is defined.

Figure 2:
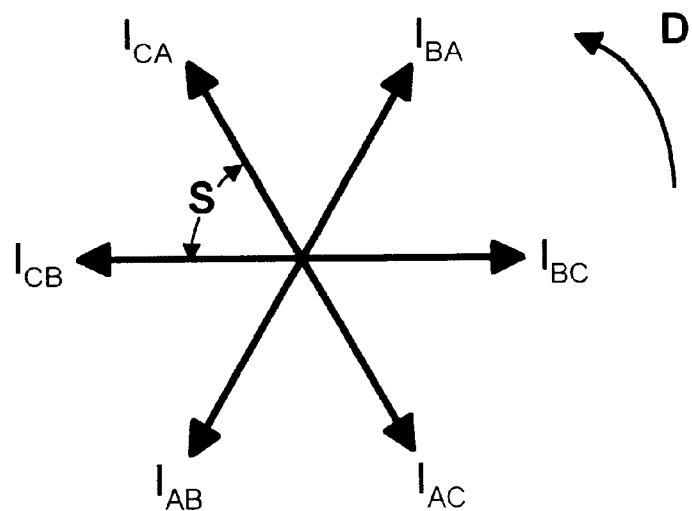
FIG. 2 is a diagram of current Park vectors for an inverter producing 120 degree current conduction.

Maximum torque for a 120° conduction inverter operation is achieved when the flux vector R of the rotor is maintained at a 90°±30° angle with respect to the current Park vector. Thus, for maximum torque to occur—assuming the windings A, B, C are energized such that the current Park vector is moved in a positive direction D in an IAB-to-IAC-to-IBC-to-IBA-to-ICA-to-ICB sequence (see FIG. 2)—the rotor flux vector R is to be maintained within a 90°±30° angular range with respect to the current Park vector. (Note that the rotor will rotate in an opposite direction if the sequence is reversed).

An inverter portion 16 of the drive system 10 is connected to terminals 14A, 14B, 14C of the motor portion 12 of the drive system 10. The inverter 16 includes high switches 18A+, 18B+, 18C+ and low switches 20A−, 20B−, 20C− coupled between a positive dc link 22 and a negative (relative to the positive link 22) reference link 24. The switches 18A+, 18B+, 18C+, 20A−, 20B−, 20C− of the inverter 16 are typically solid state devices and have reverse reactive current flow capability via their companion diodes 25.

The drive system 10 further includes commutation logic 26, which provides gating commands COM for controlling the on-off states of the switches 18A+, 18B+, 18C+, 20A−, 20B−, 20C−. The commutation logic 26 can be, for example, a state machine. A state machine for a three-phase winding would have six states, each state corresponding to a set of commutation commands that produces a current Park vector. Table 1 shows an embodiment for controlling the switches 18A+, 18B+, 18C+, 20A−, 20B−, 20C− in order to obtain 120-degree conduction in the motor windings A, B, C. During each 60 degree sector of a 120 degree conduction, one switch is gated on while another switch is on-off modulated. While the other four switches are turned off reverse reactive current flow is still possible via their companion diodes 25.

TABLE 1

| On Switch | 18A+ | 20C− | 18B+ | 20A− | 18C+ | 20B− |
|---|---|---|---|---|---|---|
| Modulating Switch | 20B− | 18A+ | 20C− | 18B+ | 20A− | 18C+ |
| Current Park vector | IAB | IAC | IBC | IBA | ICA | ICB |

For example, the commutation logic 26 produces a magnetic field represented by the current Park vector IAB while providing gating commands COM that turn on one switch 18A+ and modulate another switch 20B−. Current flows through windings A and B. and winding C becomes non-conductive, except for any reactive current flowing through the companion diode 25. When the commutation logic 26 receives a pulse NXT on its input, it performs a sequential commutation by turning on switch 20C− and modulating switch 18A+. Windings A and C would become conductive, and winding B would become non-conductive. Resulting is a magnetic field represented by the sequentially next current Park vector, IAC. (For rotation in an opposite direction, the next current Park vector would be ICB instead of IAC).

The drive system 10 further includes a control 28 that generates a control signal PWM for pulse width modulating the modulating switch. Increasing the duty cycle of the control signal PWM increases the on-time of the modulating switch, which in turn, increases the amount of current flowing through the windings. A closed loop speed control, for example, might generate the control signal PWM in response to a speed command and feedback information from a speed sensor.

The drive system 10 further includes a transition detection circuit 30, which generates pulses NXT for commanding the commutation logic 26 to perform commutation and thereby maintain the current Park vector within a 90°±30° angular range with respect to the rotor flux vector R. The transition detection circuit 30 extracts information from two motor voltage parameters, which enables rotor position to be determined and commutation to occur without the need for rotor position sensors.

Before describing the structure of the transition detection circuit 30 in greater detail, some background information will be provided. In each winding during the 120 degree conduction interval, no current is flowing for approximately 60 degrees of every 180 degrees of electrical rotation. During either the first or second half of this 60 degree rotation, depending upon the commutation sequence and the direction of rotation, the imaginary component Uy and the real component Ux of the emf Park vector can be extracted. During the other 30 degrees of rotation, a companion diode 25 is conducting currents across the switches 18A+, 18B+, 18C+, 20A−, 20B−, 20C− of the inverter 16, the voltage across the non-conducting winding will be zero. However, the voltage measurements of the emf Park vector are still made during the entire 60-degrees rotation. The correct modulation sequence is determined by the direction of rotation and commutation sequence (see Table 1). Note that even though information gathered during the first 30-degrees is falsified due to the conduction of the companion diodes 25 in the "non-conducting" phase, as described above, no additional logic is required. The reason is that the location of the "falsified" vector does not cause incorrect triggering since the value of the imaginary component Uy is measured as zero instead of a negative value, and a positive value Uy is required for commutation.

The transition detection circuit 30 extracts the components Ux and Uy during the entire 60 degree rotation during which neither the positive or the negative transistors of phase A are gated into conducting. During the second half of the non-conduction interval, the exact value of the imaginary component Uy and an estimated value (including an IR term) of the real component Ux are determined. These measurements are made under the assumption that the axis of the reference frame is aligned with the axis of the current Park vector. The non-conducting winding to be measured is shown in Table 2.

TABLE 2

| Segment | IAB | IAC | IBC | IBA | ICA | ICB |
|---|---|---|---|---|---|---|
| Winding | C | B | A | C | B | A |

Figure 3:
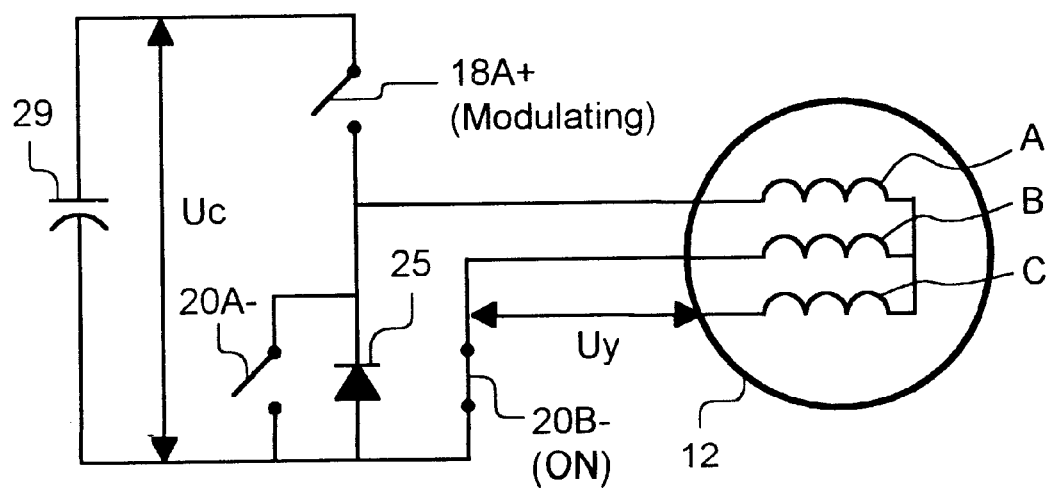
FIG. 3 is an illustration of an inverter that is energizing selected windings to produce a magnetic field.

The real component Ux can be estimated as a product of average duty cycle for the modulating switch and the voltage on the positive dc link 22. The positive dc link voltage is measured and the control signal PWM is filtered to produce the average duty cycle. The imaginary component Uy is measured as the voltage between one of the dc links 22 or 24 and the "non-conducting" winding while a short-circuit is being applied across the other two phase windings (that is, while the modulating device is turned-off and the current transfers to the companion diode 25 in the modulating leg). The emf and terminal voltage vectors differ only by the IR drop of the winding, since the L di/dt term is negligible at the fundamental frequency of the BLDCM 12 in its operating regime. For example, the real component Ux for the current Park vector IAB is determined by multiplying the average duty cycle PWM for the switch 18A+ and the measured voltage Uc on the positive dc link 22 (as measured by a capacitor 29); and the imaginary component Uy is measured as the voltage between the non-conducting winding C and the short-circuited conducting windings (see FIG. 3).

Figure 4:
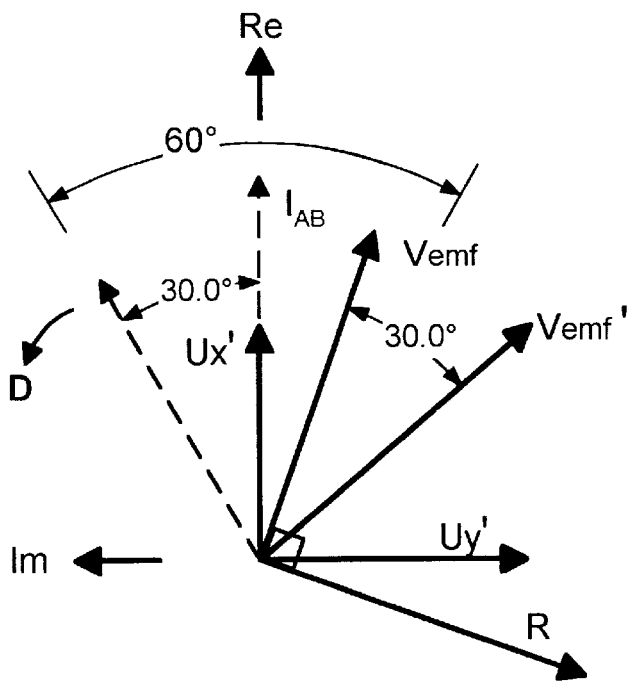
FIG. 4 is a diagram of Park vectors for a three-phase brushless dc motor.

FIG. 4 shows when commutation should occur in order to maintain the rotor flux vector R with respect to the current Park vector IAB within a 90°±30° angular range. The 60° locus of the emf Park vector Vemf is said to be in a synchronous frame coordinate system when oriented in the direction of the current Park vector IAB. (The emf Park vector Vemf leads the rotor's flux vector R by 90 degrees). Commutation should occur when the emf Park vector Vemf has rotated in the positive direction D past the current Park vector by 30 electrical degrees. The commutation point is detected by rotating the emf Park vector Vemf backwards (CCW) by 30 electrical degrees and determining when the imaginary component Uy' of the rotated emf Park vector Vemf passes through zero.

When the imaginary component Uy' of the rotated emf Park vector passes through zero, a new selection of the sequentially next winding and modulating switch is made. Thus, accurate information relative to rotor/stator position can be obtained after every 60 electrical degrees of rotation.

Returning to FIG. 1, the structure of the transition detection circuit 30 will now be described. The transition detection circuit 30 includes a voltage selection matrix 32 for performing the voltage measurements to obtain the imaginary component Uy and an estimate of the real component Ux as the product of a signal proportional to the positive dc link voltage 22 and a signal representing the average duty cycle PWM. When measuring the voltages, selection of the non-conducting winding is based upon the state of the switches and the direction of motor rotation. The signal representing the average duty cycle is provided by a filter 33.

A rotation and extraction block 34 rotates the emf Park Vector Vemf backwards by 30 electrical degrees and extracts an imaginary component Uy' of the rotated vector Vemf':

$$Uy' = \frac{1}{2}Ux - \frac{\sqrt{3}}{2}Uy$$

A comparator 36 compares the rotated imaginary component Uy' with zero. When the rotated imaginary component Uy' reverses polarity, the comparator output goes high and a one-shot 38 generates a pulse NXT. In response to the pulse NXT, the commutation logic 26 transitions to the sequentially next set of commutation commands. For example, the commutation logic 26 is generating a current gating command COM that creates a magnetic field represented by the first current Park vector IAB. During the entire half of the "non-conduction" interval for the winding A, the voltages will be measured, the imaginary component Uy' of a rotated emf Park vector Vemf' will be extracted and rotated, and the one-shot 38 will deliver another pulse NXT when the imaginary component Uy' changes polarity. The pulse NXT then causes the commutation logic 26 to generate gating commands for a magnetic field represented by the sequentially next current Park vector IAC.

The drive system 10 can optionally include a voltage-controlled oscillator that supplies a transition signal to the commutation logic 26 during an initial startup. The voltage-controlled oscillator ensures a transition through at least two or three states such that the rotor can be rotated out of any condition of rotor stator alignment at zero speed.

Figure 5:
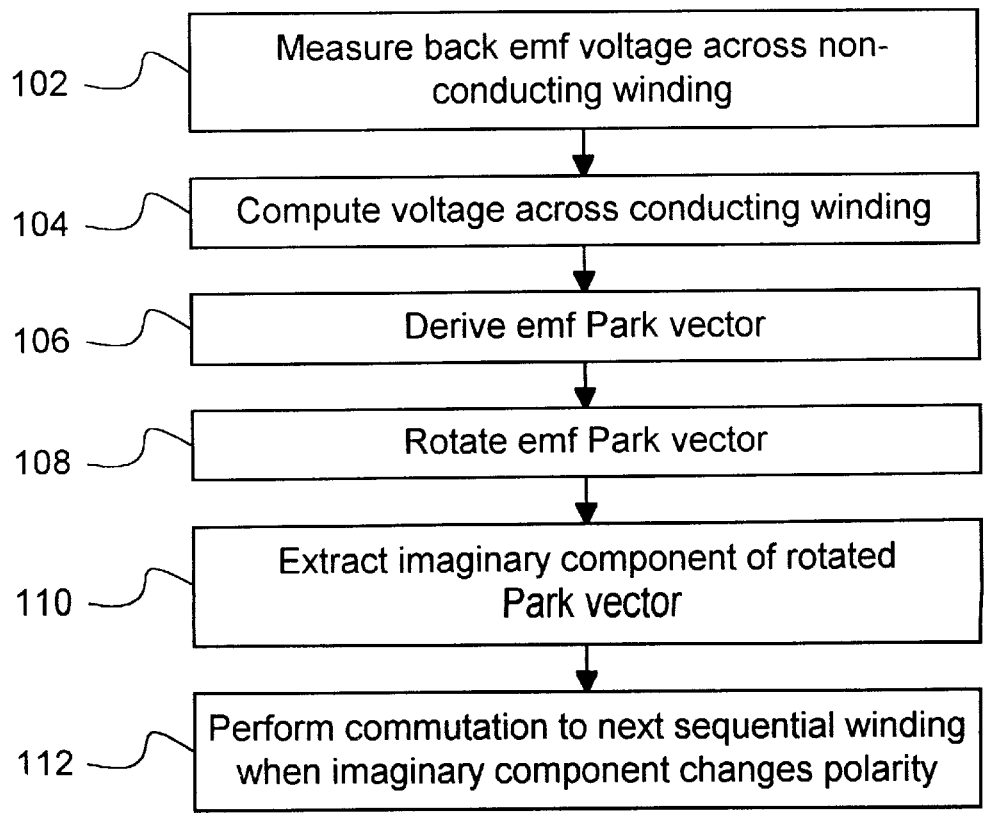
FIG. 5 is a flowchart of a method of operating the brushless dc motor without rotor position sensors.

FIG. 5 shows a generalized method of operating the BLDCM 12. The method includes the steps of measuring back emf voltages across a winding that is nonconducting (block 102); computing a voltage across a winding that is conducting (block 104); deriving an emf Park vector from the voltages (block 106); rotating the emf Park vector backwards by one-half a sector angle (block 108); extracting an imaginary component from the rotated Park vector (block 110); and performing commutation to the next sequential winding when the imaginary component changes polarity (block 112).

Thus disclosed is a brushless dc motor drive system in which commutation is performed without rotor position sensors. Eliminating the rotor position sensors eliminates problems due to mechanical alignments and temperature incompatibility between the motor windings and electronic components. Eliminating the rotor position sensors also reduces the difficulty in assembling the motor and lowers the cost of the brushless dc motor drive system.

The invention is not limited to the specific embodiment shown above. For example, the brushless dc motor is not limited to a two-pole permanent magnet rotor construction, nor is it limited to the three-phase stator winding configuration. Construction of the inverter and the control depend upon the operating requirements of the brushless dc motor system. The imaginary component does not have to be rotated in order to detect a commutation point, but instead could be compared to a predetermined value.

Therefore, the invention is not limited to the specific embodiment show above. Instead, the invention is to be construed according to the claims that follow.

We claim:

1. A method of operating a brushless dc motor, the motor including a plurality of motor windings, the method comprising the steps of:

determining a back emf voltage across a non-conducting winding of the motor;

determining a voltage across a conducting winding of the motor;

determining an emf Park vector from the determined voltages;

extracting a component from the determined voltages; and processing the component to determine when to perform commutation.

2. The method of claim 1, the motor including terminals for the windings, wherein the back emf voltage is determined by measuring the back emf at the terminals.

3. The method of claim 1, power for the motor being supplied on a dc link, motor speed being controlled by a pulse width modulated control signal, wherein the voltage across the conducting winding is determined by measuring a voltage on the dc link; determining an average duty cycle of the control signal; and computing the voltage across the conducting winding as a product of the voltage on the dc link and the average duty cycle.

4. The method of claim 1, wherein the component is processed during the non-conduction interval.

5. The method of claim 1, wherein the component is extracted by:

rotating the emf Park vector by a fixed angle; and determining an imaginary component of the rotated vector.

6. The method of claim 5, wherein the emf Park vector is rotated backwards by one-half a sector angle.

7. The method of claim 1, wherein a commutation point occurs when the imaginary component changes polarity.

8. The method of claim 7, wherein the imaginary component is compared to zero, whereby the commutation point occurs when the imaginary component of the rotated vector passes through zero.

9. A system comprising:

a brushless dc motor including a rotor and a plurality of windings, a back emf being induced in the windings when the rotor is rotated relative to the windings;

an inverter including high and low switches for the windings;

commutation logic for providing a sequence of gating commands that, when supplied in the sequence, cause the switches to selectively energize the windings to create a motor torque that causes the rotor to rotate;

first means for measuring a back emf voltage across a non-conducting winding of the motor;

second means for computing a voltage across a conducting winding of the motor;

third means for extracting a component from the determined voltages;

fourth means for processing the component to cause the commutation logic to supply the gating commands in the sequence,; and wherein the third means extracts the component by determining an imaginary component of a rotated emf Park vector.

10. The system of claim 9, the motor including terminals for the windings, wherein the first means measures the back emf voltage at the terminals.

11. The system of claim 9, further comprising a dc link for supplying power to the motor; a speed control for generating a pulse width modulated control signal; and a filter for filtering the control signal; wherein the second means computes the voltage across the conducting winding as a product of voltage on the dc link and the filtered control signal.

12. The system of claim 9, wherein the fourth means processes the imaginary component during a non-conduction interval.

13. The system of claim 9, wherein the emf Park vector is rotated backwards by one-half a sector angle, and wherein a commutation point occurs when the imaginary component of the rotated emf Park vector changes polarity.

14. A circuit for controlling an inverter coupled to a brushless dc motor, the motor including a plurality of motor windings, a back emf being induced in the windings when the rotor is rotated relative to the windings, the inverter including high and low switches for the windings, the circuit comprising:

commutation logic for providing a sequence of gating commands that, when supplied in the sequence, cause the switches to selectively energize the windings to create a motor torque that causes the rotor to rotate;

means for determining a Park vector of the motor;

means for extracting a component of a rotated Park vector; and means for processing the component to cause the commutation logic to supply the gating commands in the sequence.

15. The circuit of claim 14, wherein the means for extracting the component includes means for determining voltages across conducting and nonconducting windings of the motor, and means for deriving a component of a rotated emf Park vector from the measured voltages.

16. The circuit of claim 15, wherein the motor includes terminals for the windings, and wherein back emf voltage of the non-conducting winding is measured at the terminals.

17. The circuit of claim 15, a dc link for supplying power to the motor; the circuit further comprising means for providing a pulse width modulated control signal; means for determining average duty cycle of the control signal; wherein voltage across the conducting winding is determined as a product of voltage on the dc link and the average duty cycle.

18. The circuit of claim 15, wherein an imaginary component of the rotated vector is extracted; and wherein a commutation point occurs when the imaginary component of the rotated emf Park vector changes polarity.

19. The circuit of claim 18, wherein the imaginary component is processed during a non-conduction interval.

* * * * *